Patented Jan. 25, 1949

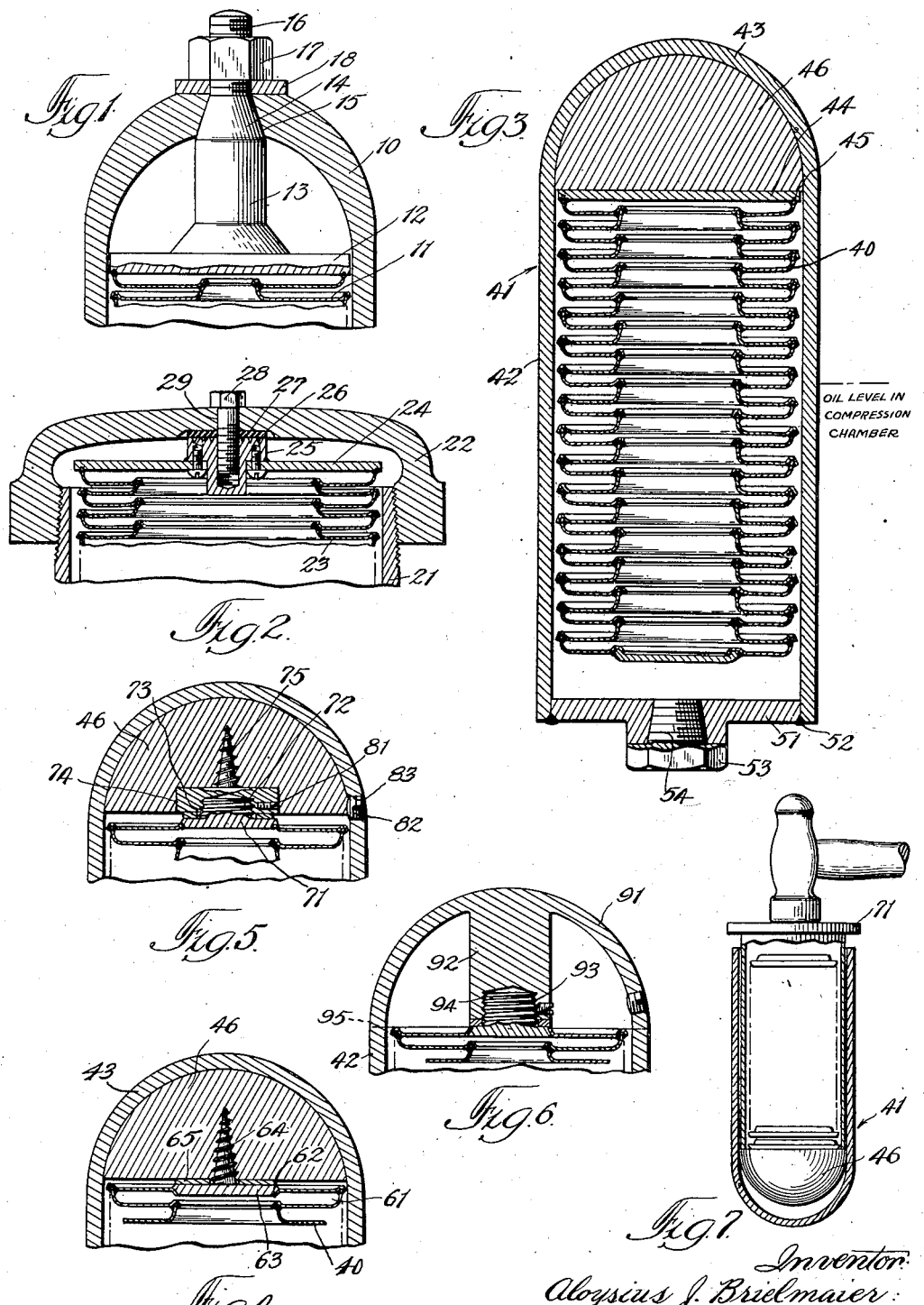

2,460,121

UNITED STATES PATENT OFFICE 2,460,121

WATER-HAMMER ARRESTER

Aloysius J. Brielmaier, Milwaukee, Wis., assignor to Water Hammer Arrester Corp., Milwaukee, Wis., a corporation of Wisconsin Application July 10, 1944, Serial No. 544,322

14 Claims. (Cl. 138—30)

This invention relates to a water-hammer arrester and more particularly to an arrester comprising a casing inclosing a sectional bellows of resilient metal to serve as the pressure-wave absorbing element.

Heretofore arresters of the type referred to have comprised a metal casing having a wall of sufficient thickness and tensile strength to withstand the high pressures created by the moving column of water upon the creation of water-hammer, closed at one end except for an opening to connect the arrester to the pipe line, and having therein a closed bellows of resilient metal. By way of example, the bellows illustrated herein consists of a series of diaphragms joined alternately at their inner and outer peripheries, each diaphragm being characterized by a flat section having cupped inside and outside edges, and the bellows is adapted to absorb the pressure by varying the relative volumes inclosed within the bellows and between the exterior of the bellows and the interior wall of the casing. The bellows is fixed at one end and free at the other so that it may be compressed upon water-hammer pressure.

In one predominating type of arrester the bellows is fixed with respect to the casing by attaching the bellows to a rigid plate carrying a stud with a tapered part fitting closely within a correspondingly tapered portion through the wall of the arrester. The stud continues through the casing wall and terminates in a threaded portion, and a nut bearing on a washer of yieldable material, e. g., rubber, is employed to force the tapered portion of the stud into intimate engagement with its hole, whereby it is intended to seal the interior of the casing from the atmosphere and prevent leakage of the water. However, in practice such expedient is unsatisfactory as it is a difficult matter mechanically to produce a close engagement between the two mating tapered elements, and such fit, even if initially attained with some degree of accuracy soon becomes defective under the repeated shocks given the bellows and its supporting means. Leakage, thus once begun, soon encourages corrosion in the joint, and the device must be discarded.

Accordingly, the principal object of the arrester of this invention is to provide a support for one end of the bellows with respect to the casing by means which does not necessitate the use of a permanent opening through the casing wall.

Another object is the provision of means as aforesaid comprising an insert adapted to be held firmly within the casing in predetermined relation therewith.

A further object is the provision of an insert as aforesaid, provided, in certain embodiments of the invention, with means to receive an element of the bellows for supporting one end of the latter in operative position therewith.

An additional object is the provision of an insert as aforesaid comprising material which may be compressed as the insert is fitted into position within the casing, and thereafter expand upon exposure to the fluid, e. g., water, to insure the permanence of its initial location.

Another aim is to provide a unitary arrester casing provided with a member interiorly thereof to support the fixed end of the bellows.

Other and further objects will appear from the description and drawings, of which latter:

Fig. 1 is a partial view in longitudinal cross section showing a bellows support of the prior art, as detailed hereinabove;

Fig. 2 is also a partial view in similar cross section showing an alternative form of bellows support as employed in certain devices of the prior art;

Fig. 3 is a view in similar cross section of the arrester constituting the present invention in its preferred embodiment;

Figs. 4, 5 and 6 are partial views in similar cross section of alternate forms of the invention; and Fig. 7 is a view on somewhat reduced scale showing one method of assembling the bellows and insert in the casing in certain forms of the invention.

Referring first to Fig. 1, 10 indicates the cylindrical casing of a typical arrester of the prior art, inclosing a sectional circular bellows of resilient metal 11 supported by and sealed to a rigid circular plate 12 from which projects the integral post 13 having a tapered portion 14 snugly fitting a correspondingly tapered aperture 15 through the upper end wall of the casing 10. The extremity 16 of the post 13 is screw-threaded to take the nut 17, and a washer of yieldable material 18 interposed between the nut 17 and casing 10 is intended to provide a seal therebetween. From the foregoing it will be seen that the attainment of a perfectly mated joint between the post 14 and aperture 15 is difficult by ordinary machining operations; and a suitable ground fit would be expensive and unsatisfactory at best even with metals that could be hardened. The use of expensive workmanship and material would be prohibitive when the nature of the device is considered, as the same must be manufactured in large quantities for sale at a reasonable price, primarily for use in homes. Furthermore, reliance cannot be placed on the washer 18 as time affects its sealing qualities. Inasmuch as the devices are most frequently concealed between partitions or behind walls the question of repair of leaks or of replacement will create a serious problem.

In Fig. 2 is shown another type of arrester in common use for the larger sizes, comprising the cylindrical casing 21 closed at the one end shown by a cap 22 screw-threaded thereto, and containing the bellows 23 with its supporting plate 24. To the latter is screwed and soldered the bushing 25 provided on its upper face with circular serrations 26 for engaging intimately a sealing washer 27. A cap screw 28 passing through an aperature 29 in the cap 22 forces the bushing 25 into intimate contact with the washer 27 to insure against leakage through the aperture 29. The shortcomings pointed out in connection with the device of Fig. 1 will be seen to exist with the device of Fig. 2. In any water-hammer arrester the maximum pressure resulting from a wave of fluid-hammer ranges from 500 to 1000 pounds in most cases, and in certain types of applications may reach much higher ranges. Accordingly, it has been found that any opening in the casing is highly undesirable, as leaks soon develop and repairs are most often extremely expensive.

The bellows usually contains air together with oil or other suitable fluid, or the air and fluid may be mixed into a foam-like emulsion. A typical oil level is shown by a note to the right of Fig. 3.

Now adverting to Fig. 3, I have shown a preferred form of my invention comprising a casing 41 having a cylindrical body portion 42 and a closed hemispherical cap portion 43 which may be initially formed integrally with said body as by taking a section of tubing and spinning or forging the closed cap portion 43 thereon, or the two portions may be separately formed, and welded or otherwise joined to form a one-piece structure.

In this embodiment of the invention the bellows 40 is provided with a rigid flat-supporting disc 44 to which the last diaphragm of the bellows is attached by being inserted in an annular channel 45, and the two united by soldering, brazing or equivalent means.

To provide a seat for the disc 44 and thereby restrain that end of the bellows 40 upon its compression by fluid-hammer pressure, a filler or insert 46 is forced into the interior of the cap portion 43. As shown, the insert 46 is also of hemispherical form but of slightly greater radius than the inner radius of the cap portion 43, and the insert is preferably formed of material which may be compressed during insertion thereof in the cap portion 43 but has sufficient elasticity to maintain tight frictional contact with the inner surface of the cap portion 43 and thereby retain its position. Where the fluid is water, wood is preferred, and particularly cypress, from any tree of the genus Cupressus, as these woods will absorb water and expand without deteriorating. For other fluids, other materials may be found more suitable, for example, plastic compositions characterized by the desired compressibility and expansibility while possessing the desired resistance to deterioration by the fluid.

The insert 46 may be driven into the cap portion 43 in any convenient way, for example, by an arbor press or a hammer. After that step the bellows 40 is located and a base portion 51 fitted within the body portion 42 and integrally joined therewith by welding or the like, as at 52. Base portion 51 may be provided with a hexagonal boss 53 for engagement by a wrench whereby the arrester is attached to the fluid system, and may be further provided with a threaded interior 54 to receive a pipe fitting from which fluid enters the device.

From the foregoing it will be observed that the casing is imperforate except where the opening 54 is provided for attachment of the device and thus the possibility of leakage of fluid is entirely eliminated.

Referring now to Fig. 4, a slightly modified form of the invention is shown. All details of construction are as described in connection with Fig. 3 except that the bellows terminates with a full section 61 instead of a single diaphragm, and the inner opening 62 of the section is fitted with a rigid disc 63 soldered or otherwise permanently fastened to the bellows. Projecting from and forming a part of the disc is the screw-threaded member 64, provided with threads suitable for engagement with the material forming the insert 46. For wood, as shown by way of example, the member 64 would resemble a wood screw, tapered and with sharp threads. Intermediate the disc 63 and flat face of the insert 46 may be placed a lock washer 65 of any common type. In this embodiment the insert 46 and bellows 40 could be assembled prior to the insertion of both as a unit into the casing, or the insert could be fitted into the cap portion 43 as described in connection with Fig. 3 and the bellows screwed into position thereafter. In the former case the method could be as shown in Fig. 7, wherein a thin-walled tube adapted to fit between the outer periphery of the bellows and the inner surface of the casing is placed against the insert 46 and a flat plate 71 used to receive hammer blows or the post of an arbor press. If the insert is positioned in the casing first the bellows could then be provided at the lower end with a hexagonal or other projection for engagement by a socket wrench or spanner so that it may be turned to force the screw 64 into the insert 46.

Fig. 5 represents still another alternative construction in which the disc 71 is provided with a threaded stud 72 adapted to engage a correspondingly threaded aperture 73 in the member 74. The latter is provided with a screw-threaded projection 75 analogous in function to the screw 64 whereby the member 74 is firmly retained in the insert 46. For larger sizes of arresters the screw-threaded member 64 of Fig. 4 may not be sufficiently supported in the insert 46, but by using a member 74 of metal as an intermediary, proper support is provided, as the cylindrical body of member 74 presents an extended bearing surface to the softer material of the insert 46. Thus, any tendency of the bellows exhibiting itself as radial thrust or twisting action is effectively counteracted and loosening of the joint obviated.

Preferably stud 72 may be more effectively retained in the member 74 by the use of a set screw 81, to which access may be had through the aperture 82 plugged by a headless screw 83. To insure against leakage, the screw 83 may, after assembly, be covered by welding or brazing, or the screw 83 may be omitted and the aperture 82 itself plugged in any convenient permanent manner.

In Fig. 6 an alternative construction is shown in which the cap portion 91 may be separately formed as by forging or casting, and provided with an inwardly extending integral boss 92 having a screw-threaded aperture 93 to receive the stud 94 affixed to the bellows as described in connection with Fig. 5. The cap 91 may be welded or brazed to the body portion as at 95 to form a unitary structure.

From the foregoing it will be understood that the invention in its essentials is not confined to an arrester having a hemispherical cap portion, but is equally applicable where the arrester body is purely cylindrical and hence has a flat top, or to an arrester having a conical or other shape of cap. In any of those constructions the insert would be formed to follow the inner contour of the cap portion and adapted to be firmly held therein by frictional contact.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A fluid-hammer arrester having a casing including an inlet portion for connecting the arrester to a fluid conduit for flow of fluid thereinto, the remainder of said casing being imperforate, said casing being adapted to receive an expansible and compressible bellows therewithin for absorbing fluid-hammer pressure, and means within said casing to maintain one end of said bellows longitudinally immovable when fluid-hammer pressure is applied to said bellows.

2. A fluid-hammer arrester having a casing including an inlet portion for connecting the arrester to a fluid conduit for flow of fluid thereinto, the remainder of said casing being imperforate and inclosing a hemispherical zone forming a part of the interior of said casing, a hemispherical insert in said casing within said zone, and an expansible and compressible bellows within said casing for absorbing fluid-hammer pressure, said bellows having a flat surface at the end thereof adjacent said zone adapted to contact said insert upon the occurrence of fluid-hammer pressure.

3. A fluid-hammer arrester having a casing including an inlet portion for connecting the arrester to a fluid conduit for flow of fluid thereinto, an expansible and compressible bellows within said casing for absorbing fluid-hammer pressure, and an insert of compressible re-expansible material of slightly greater external dimensions than the inside dimensions of said casing to maintain one end of said bellows longitudinally immovable when fluid-hammer pressure is applied to said bellows.

4. A fluid-hammer arrester having a casing including an inlet portion for connecting the arrester to a fluid conduit for flow of fluid thereinto, an expansible and compressible bellows within said casing for absorbing fluid-hammer pressure, and a wooden insert of slightly greater external dimensions than the inside dimensions of said casing to maintain one end of said bellows longitudinally immovable when fluid-hammer pressure is applied to said bellows.

5. A fluid-hammer arrester having a casing including an inlet portion for connecting said arrester to a fluid line, the remainder of said casing being imperforate and having an interior hemispherical contour at one end thereof, a hemispherical insert of compressible re-expansible material provided with a flat face, said insert having a slightly greater radius than that of the said end of the casing and held within said end by frictional engagement therewith, means within said casing including an expansible and compressible bellows for absorbing fluid-hammer pressure, one end of said bellows adapted to contact said flat face of said insert and be held immovable at said end upon fluid-hammer pressure.

6. A fluid-hammer arrester having a casing including an inlet portion for connecting said arrester to a fluid conduit, the remainder of said casing being imperforate and having an interior hemispherical contour at one end thereof, a hemispherical insert of compressible re-expansible material in said casing, said insert having a slightly greater radius than that of the hemispherical interior portion of the casing and held within said hemispherically contoured portion of said casing by frictional engagement therewith, means within said casing including an expansible and compressible bellows for absorbing fluid-hammer pressure, means carried by the flat face of said insert and said bellows for operatively connecting said bellows to said insert.

7. A fluid-hammer arrester having a casing including an inlet portion for connecting the arrester to a fluid line for flow of fluid thereinto, means within said casing including an expansible and compressible bellows for absorbing fluid-hammer pressure, said bellows being provided at one end thereof with a screw-threaded member, and an insert held within the casing and adjacent the screw-threaded member for receiving said member to maintain said bellows immovable at that end when fluid-hammer pressure is applied.

8. A fluid-hammer arrester having a casing including at one end an inlet portion for connecting the arrester to a fluid line for flow of fluid thereinto, means in said casing including an expansible and compressible bellows for absorbing fluid-hammer pressure, a screw-threaded member at one end of said bellows, and an insert held within the casing and adjacent the screw-threaded member for receiving said member to maintain said bellows immovable at that end when fluid-hammer pressure is applied, said insert including a portion of material having greater hardness than the insert for receiving said screw-threaded member.

9. A fluid-hammer arrester having a casing including an inlet portion for connecting the arrester to a fluid line for flow of fluid thereinto, said casing being provided with a boss extending inwardly of said casing, means within said casing including an expansible and compressible bellows for absorbing fluid-hammer pressure, and means at one end of said bellows for operatively connecting said bellows to said boss to maintain said bellows immovable at that end when fluid-hammer pressure is applied.

10. A fluid-hammer arrester adapted for connection to a fluid conduit comprising a one-piece casing including a tubular body portion, a base portion and a cap portion, said base portion including a fluid inlet and means to attach the arrester to the conduit, said cap portion comprising a substantially hemispherical shell and a boss extending inwardly of the casing, said body, base and cap portions being permanently joined to form said casing, said casing being adapted to receive an expansible and compressible bellows for absorbing fluid-hammer pressure, and means for operatively connecting the end of said bellows adjacent said cap portion to said boss.

11. A fluid-hammer arrester adapted for connection to a fluid conduit comprising a casing including a body portion, an element in said body portion for absorbing fluid-hammer pressure, said element comprising a bellows of resilient metal, there being a base portion for connecting the arrester to the conduit for passage of fluid into said casing and an upper portion having a hemispherical interior contour, an insert frictionally maintained within the interior of said upper portion and shaped to correspond with said interior contour, and a screw-threaded member affixed to said bellows adapted to engage said insert to maintain a fixed relation between said end and said insert.

12. A fluid-hammer arrester adapted for connection to a fluid conduit comprising a casing including a body portion, a bellows of resilient metal in said body portion for absorbing fluid-hammer pressure, a base portion for connecting the arrester to the conduit for passage of fluid into said casing, an upper portion having a cup-shaped interior, an insert frictionally maintained within said cup-shaped interior, and a screw threaded member affixed to said bellows adapted to engage said insert to maintain a fixed relation between said end and said insert.

13. A fluid-hammer arrester adapted for connection to a fluid conduit comprising a casing including a body portion having a cylindrical interior and a cap portion having a hemispherical interior, a base portion permanently joined to said body portion having a conduit-attaching member for passage of fluid into said casing, a hemispherical insert of compressible re-expansible material frictionally maintained within said cap portion, a member of greater hardness than said insert having a screw-threaded projection for maintaining said member integrally with said insert, said member having a screw-threaded opening, a resilient metal for absorbing fluid-hammer inclosed in said body portion and having a screw-threaded portion adapted to engage said opening and maintain said bellows fixed at the extremity thereof adjacent said insert.

14. A fluid-hammer arrester adapted for connection to a fluid conduit comprising a casing including a portion adapted for connection to the conduit, an insert in said casing, said insert having a flat face in a plane transversely of said casing, a bellows formed of a plurality of annular cupped discs joined at their inner and outer peripheries to provide a unitary structure compressible and expansible under the alternate pressure and suction impulses of a fluid-hammer wave, the extremity of said bellows adjacent said insert being provided with a flat disc adapted to be attached to said bellows, the adjacent surfaces of said disc and insert being adapted to contact upon application of fluid-hammer pressure to said element whereby said element is restrained at one end while compression thereof occurs.

ALOYSIUS J. BRIELMAIER.

REFERENCES CITED

The following references are of record in the file of this patent:

UNITED STATES PATENTS

| Number | Name | Date |
|---|---|---|
| 361,649 | Rider | Apr. 19, 1887 |
| 1,169,250 | Fulton | Jan. 25, 1916 |
| 1,809,927 | Emanueli | June 16, 1931 |
| 1,950,107 | Guinn et al. | Mar. 6, 1934 |
| 2,081,077 | Wantz | May 18, 1937 |
| 2,273,766 | Tower | Feb. 17, 1942 |

FOREIGN PATENTS

| Number | Country | Date |
|---|---|---|
| 253,033 | Italy | June 29, 1925 |
| 478,591 | Great Britain | Jan. 20, 1938 |